United States Patent
Dar et al.

(10) Patent No.: US 6,881,805 B2
(45) Date of Patent: Apr. 19, 2005

(54) FREE RADICAL RETROGRADE PRECIPITATION POLYMER DISPERSIONS

(75) Inventors: Yadunandan L. Dar, Somerville, NJ (US); Chaodong Xiao, East Hanover, NJ (US); Peter J. Schlom, Somerville, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 486 days.

(21) Appl. No.: 10/045,881

(22) Filed: Jan. 11, 2002

(65) Prior Publication Data

US 2003/0149195 A1 Aug. 7, 2003

(51) Int. Cl.$^7$ ............................... C08F 4/04; C08F 4/28
(52) U.S. Cl. .................... 526/227; 526/328.5; 526/346; 526/340; 526/219.6; 526/317.1
(58) Field of Search ............................ 526/227, 328.5, 526/346, 340, 219.6, 317.1, 89; 525/267

(56) References Cited

U.S. PATENT DOCUMENTS 5,173,551 A * 12/1992 Caneba ........................ 526/208

OTHER PUBLICATIONS

Caneba et al., "Low VOC latex pants from a precipitation polymerization process", Clean Prod. Processes, 3, 55–59(2001).*

Parker, H.Y., Westmoreland, D.G, and Chang, H.R., "ESR Study of MMA Batch Emulsion Polymerization in Real Time: Effects of Particle Size", Macromolecules 1996, 29, p. 5119–5127.

Gerard T. Caneba, Bo Wang, "Low VOC latex paints from a Precipitation Polymerization Process", Clean Prod Processes 3 (2001) 55–59 © Springer–Vrlag, 2001.

Gerard T. Caneba, "Free–Radical Retrograde–Precipitation Polymerization Process", Advances in Polymer Technology, vol. 11 No. 4 pp. 278–286, 1990.

Anuj Aggarwal, Rahul Saxena, Bo Wang, and Gerard T. Caneba; Studies of the Polymerization of Methacrylic Acid via Free–Radical Retrograde Precipitation Polymerization Process, Journal of Applied Polymer Science, vol. 62, 2039–2051 (1996).

* cited by examiner

Primary Examiner—Ling-Sui Choi
(74) Attorney, Agent, or Firm—Charles W. Almer

(57) ABSTRACT

The present invention is directed to a dispersion of polymer particles in a dispersing medium. The polymer particles each contain an average of more than two living radicals that are not chemically protected. The present invention is also directed to a free radical precipitation process involving combining at least one monomer in at least one solvent; dispersing said monomer solvent mixture in a dispersing medium that is non-miscible with the first solvent, using a surfactant, stabilizer or mixture thereof; initiating polymerization with at least one free-radical generating agent and conversion, to produce polymer particles containing radicals trapped by precipitation by virtue of being above the lower critical solution temperature of the system; and removing the precipitating agent either during or after free-radical generation to form a dispersion polymer in the dispersing medium having living, trapped radicals.

10 Claims, No Drawings

FREE RADICAL RETROGRADE PRECIPITATION POLYMER DISPERSIONS

FIELD OF THE INVENTION

The invention relates to a polymeric dispersion having multiple, living polymeric free radicals trapped in the polymer particles. These living polymeric free radicals can be further reacted to form higher molecular weight polymer, or copolymers. The invention also relates to a free radical retrograde precipitation polymerization (FRRPP) process for producing the dispersion (co)polymers.

BACKGROUND OF THE INVENTION

Free radical polymerization is a preferred technique in the synthesis of many polymers. One drawback of free radical polymerization is the lack of control over the polymer architecture produced. The type and amount of initiator, temperature, and delayed monomer feeds have all been used to control the final structure and size of the polymer particles.

Living polymers offer some control of the polymer structure. Living polymers are polymers having an active/growing end on a polymer chain (non-terminated polymer chain). Most commonly, living ends are formed by anionic polymerization in non-polar solvent, or involve a capping-mechanism to stop a growing free-radical, then restarting the polymer growth by reversible removal of the cap.

"Low VOC Latex Paints from a Precipitation Polymerization Process", Clean Prod. Processes, 3 (2001), 5–59 discloses the formation of a methyl methacrylate/butyl acrylate copolymer from a conventional precipitation reaction using n-heptane as the solvent. The resulting dispersion is bimodal. A problem with conventional precipitation polymerization is that conversion rates are generally very low, requiring a relatively expensive procedure to isolate the polymer and recycle monomer.

Chemical trapping agents are known in the art as a means of capping a living polymer radical by a reversible means, then uncapping the living radical for later continued polymerization. Unfortunately such a method requires additional purification costs to remove the trapping agent from the product.

U.S. Pat. No. 5,173,551 and "Studies of the Polymerization of Methacrylic Acid via Free-Radical Retrograde Precipitation Polymerization Process", J. Applied Polymer Science, Vol. 62, 2039–2051 (1996) describe the use of a free-radical retrograde polymerization process as a means of controlling the polymer molecular weight distribution. In this process a monomer mixture in a solvent is initiated by a solvent-soluble free radical initiator to produce polymer radicals that precipitate into polymer-rich phases in a solvent. The above patent also addresses the capability of FRRPP to control the activity of polymer radicals and use them to produce copolymers. Additionally it provides a detailed description of the original process, a possible apparatus for running it, and ways of regulating the rate of reaction through changing temperature and pressure and adding or removing monomers or inert diluents.

Surprisingly, it has been found that a dispersion containing polymer particles containing multiple living polymer radicals can be formed using a free radical retrograde precipitation process. The free radical containing dispersion can be further reacted with additional amounts of the same monomer to form higher molecular weight polymer, or reacted with a second monomer to form a block copolymer dispersion having a controlled structure. This method can be used to produce block copolymers having a controlled morphology and molecular weight. The process can also produce block copolymer emulsions of monomers previously not capable of forming stable emulsion polymers.

SUMMARY OF THE INVENTION

The present invention is directed to a dispersion of polymer particles in a dispersing medium. The polymer particles each contain an average of more than 2 living radicals that are not chemically protected.

The present invention is also directed to a free radical precipitation process involving
a) combining at least one monomer in at least one solvent;
b) dispersing said monomer solvent mixture in a dispersing medium that is non-miscible with the first solvent, using a surfactant, stabilizer, or mixture thereof;
c) initiating polymerization with at least one free-radical generating agent and conversion, to produce polymer particles containing radicals trapped by precipitation by virtue of being above the lower critical solution temperature of the system;
d) Controlling the rate of reaction of the radicals by controlling the reactor conditions including, but not limited to, temperature, pressure, and composition.
e) removing the precipitating agent either during or after free-radical generation to form a dispersion polymer in the dispersing medium having living, trapped radicals.

A second stage monomer can then be added to form a polymer or copolymer emulsion. The second stage monomer may be either the same as the first stage monomer, or one or more different monomers.

DETAILED DESCRIPTION OF THE INVENTION

The present invention is directed to a dispersion of polymer particles each containing multiple living radicals which are not chemically protected. The invention is also directed to a free radical retrograde precipitation process by which a dispersion containing polymer particles having multiple living radicals is formed. These living polymer radicals can be further reacted with additional monomer, either the same monomer to increase the polymer molecular weight, or another monomer or monomers to form block copolymers.

Free radical retrograde precipitation polymerization (FRRPP) is a process for controlling free radical polymerization. The process uses precipitation of polymer chains to control the activity of growing polymer free radicals. The polymer radicals are initiated in a poor solvent, causing the polymer to form a precipitate. Living polymer radicals can be occluded within the precipitated polymer domains, and thereby their activity can be controlled. The precipitation causes a severe reduction in the rates of diffusion of the polymer radicals. This reduces the termination rate constant by several orders of magnitude, but reduces the rate of propagation to a much lesser degree.

A dispersion, as used here, means a system containing polymer particles that are dispersed in a liquid dispersion medium. The polymer particles are stabilized by surfactant(s), other stabilizers, or mixtures thereof.

The process for producing the polymer dispersion of the present invention involves first admixing at least one monomer, at least one solvent, and at least one surfactant or stabilizer.

Monomers useful in the present invention include any monomer that can undergo free radical chain polymerization. Especially useful monomers are ethylenically unsaturated monomers. Examples include (meth)acrylates; maleates; vinyl esters; itaconates; styrenics; unsaturated hydrocarbons; nitrogen functional monomers such as acrylonitrile, alkyl acrylamides n-vinyl formamide, vinyl pyrrolidone, (meth)acrylic acid, and N-caprolactam. The term (meth) acrylates, as used herein, refers to both acrylate as well as methacrylate monomers and their derivatives. Similar, the term (meth)acrylic acids refers to acrylic acid, methacrylic acid and their derivatives. Low levels of crosslinking monomers may also be used as known in the art to improve certain properties of the polymers.

The solvent useful in the present invention is selected such that the polymer-rich phase of the admixture that ensues during polymerization can be maintained in the reactor system at a temperature above the Lower Critical Solution Temperature ("LCST") of the admixture. By "LCST" as used herein is meant the temperature above which a polymer will become less soluble in a solvent/polymer admixture as the temperature of the admixture is increased. Also, the solvent is preferably such that the viscosity of a resulting polymer-rich phase is suitable for mixing. Additionally, the solvent is preferably such that its employment will help minimize the amount of free-radical scavengers that may be present in the admixture of reactants. Solvents useful in the present process include, but are not limited to, organic and inorganic solvents such as acetone, methylethylketone, diethyl-ether, n-pentane, isopropanol, ethanol, dipropylketone, n-butylchloride, water, mineral oil, silicone oil, supercritical fluids, ionic fluids and mixtures thereof. Useful mixed solvent systems include, but are not limited to, ethanol/cyclohexane, water/methyl ethyl ketone, water/higher ketones such as water/2-pentanone, water/ethylene glycol methyl butyl ether, water propylene glycol propyl ether, glycerol/guaiacol, glycerol/m-toluidine, glycerol/ethyl benzylamine, water/isopropanol, water/t-butanol, water/pyridines, and water/piperidines. For a purely organic system, methanol can be substituted for water in the preceding list of mixed solvents. The solvent can be an organic and inorganic solvent such as, but not limited to, acetone, methylethylketone, diethyl-ether, n-pentane, and mixtures thereof. Mixed solvent systems such as t-butanol/water may be used. The solvent is chosen to have the properties of being a good solvent for the chosen monomer, but a poor solvent for the polymer formed from the monomer. At the reaction conditions, the solvent needs to be either a liquid or a super critical fluid.

The monomer/solvent admixture may optionally contain a polymer latex seed. It is believed that the use of a polymer latex seed can be advantageous for trapping initiated polymer radicals.

The admixture of the monomer and solvent is dispersed in a dispersing medium that is non-miscible with the first solvent. A preferred dispersing medium is water. Other dispersing media include, but are not limited to mineral oils, silicone oils, supercritical fluids, and ionic fluids. The dispersion is accomplished by means of a surfactant, stabilizer, other dispersion aids and dispersants, or a mixture thereof. Surfactants useful in the present invention include anionic, non-ionic, cationic and amphoteric surfactants. Preferred surfactants are non-ionic, such as alkyl phenol ethoxylates, alkyl ethoxylates, or other ethoxylates. Other surfactants include, but are not limited to alkyl phenol, alkyl sufate, ether sulfate, phosphate ester, and similar anionic surfactants. Stabilizers can be either polymeric or non-polymeric and include, but are not limited to polyvinyl alcohols, and amphiphilic block copolymer stabilizers. Polymeric dispersants include but are not limited to, poly(maleic acid) and copolymers of maleic acid with compatible ethylenically unsaturated monomers such as mono- and diesters of maleic acid, (meth)acrylic acid, alkyl esters of (meth)acrylic acid, hydroxyalkyl esters of (meth)acrylic acid, alpha-methyl styrene, styrene, and derivatives thereof, vinyl acetate, crotonic acid, esters of crotonic acid, and acrylamide, and derivatives thereof. Other suitable linear polymeric dispersants include, but are not limited to, polystyrene sulfonates, which are typically obtained by sulfonating poly(styrene) or copolymers of styrene with compatible ethylenically unsaturated monomers including, but not limited to, (meth)acrylic acid, esters of (meth)acrylic acid, maleic acid, and mono- and diesters of maleic acid; condensates including but not limited to naphthalenesulfonic acid-formaldehyde condensate and melamine-formaldehyde condensate. Certain natural or naturally derived polymers useful in the present invention include but are not limited to tannins, lignins, lignosulfates, alginates, dispersed or soluble starches and modified starches, and cellulosic polymers. A mixture of one or more surfactants, stabilizers, dispersants, or a combination of surfactants and stabilizers is also useful in the invention.

The system of solvent, dispersing medium, monomer/polymer is chosen to have a lower critical solution temperature (LCST) system. The temperature and the pressure of the polymerization system are regulated to maintain the system above the LCST or above the lower critical end point (LCEP). This retrograde system is such that phase separation of formed polymer particles occurs when the temperature of the system is increased above a lower critical solution temperature, forming an immiscible polymer-rich phase.

The dispersed monomer undergoes free radical initiation. The free-radical generating agent is capable of generating free radicals to initiate polymerization by the use of one or more mechanisms such as photochemical initiation, thermal initiation, redox initiation, degradative initiation, ultrasonic initiation, or the like. Preferably the initiators are selected from azo-type initiators, peroxide type initiators, or mixtures thereof. Examples of suitable peroxide initiators include, but are not limited to, diacyl peroxides, peroxy esters, peroxy ketals, dialkyl peroxides, and hydroperoxides, specifically benzoyl peroxide, deconoyl peroxide, lauroyl peroxide, succinic acid peroxide, cumene hydroperoxide, t-butyl peroxy acetate, 2,2-di (t-butyl peroxy) butane diallyl peroxide), cumyl peroxide, or mixtures thereof. Examples of suitable azo-type initiators include, but are not limited to azobisisobutyronitrile (AIBN), 1,1'-azobis (1-cyclohexane carbonitrile), acid-functional azo-type initiators such as 4,4'-azobis (4-cyanopentanoic acid). In a preferred embodiment, initiation is heterogeneous—occurring in the dispersing agent. It has been found that the use of heterogeneous initiation produces a stable dispersion. Preferably the dispersing agent is water, and the free-radical generating agent is a water-soluble initiator, such as 2,2'-Azobis (N,N'-amidinopropane) dihydrochloride or 2,2'-Azobis (N,N'-dimethyleneisobutyramidine) dihydrochloride. The free radicals react with monomer present in equilibrium amounts in the aqueous phase to form polymer chains. Due to the thermodynamics of the system, the solvent migrates to the free radical polymer emulsion particles.

The reaction of the present invention is not limited by reactor geometry. The reaction may be a batch polymerization, semi-batch polymerization, or a continuous polymerization such as in a tubular reactor. The monomer, solvent and initiator may be added at the beginning of the reaction, or may be delay fed over a period of time, as known in the art.

The first phase of the polymerization results in a dispersion of polymer particles in the dispersing medium. Each polymer particle contains on average more than two living polymer radicals. Preferably the particles contain on average at least 3 living polymer radicals, more preferably at least 5 living polymer radicals, even more preferably at least 10 living polymer radicals, and most preferably at least 20 living polymer radicals. Particles having over 100, 1000, or even 10,000 and more living polymer radicals per polymer particle have been produced. The living polymer particles of the present invention exist without chemical capping agents which are known in the art and which are added to temporarily protect the living radical. The temporary chemical capping agents are then reversible to expose the living radical.

Particle size can be controlled by the type and amount of surfactant or stabilizer used as well as during the making and processing of the dispersion. The process can produce polymer having low particle size. The average particle size is preferably from 10 to 5000 nanometers, more preferably from 10 to 500 nanometers, and even more preferably from 20 to 150 nanometers. The particle size distribution in both the first and second stages is generally unimodal, though it is possible to adjust the reaction parameters to produce polymer having a multi-modal particle size distribution.

The solvent is removed either during or after polymerization of the first stage monomer, resulting in a dispersion of polymer particles in the dispersing medium. Removal of the solvent serves to force any monomer present in the solvent into the particles containing living polymer radicals, leading to nearly complete conversion of the monomer into polymer. Obtaining a good dispersion of solvent in the dispersion medium and its removal in an optimum time frame is essential for obtaining a stable dispersion.

Once the dispersed monomer has reacted to near 100 percent, generally from 5 to 10 initiator half lives, additional monomer can then be added to the polymer particles containing multiple living radicals. In the case of addition of the same monomer, polymer of a higher molecular weight will be formed. Since termination of the particles is controlled, the polymer molecular weight can be controlled to produce any desired molecular weight, with molecular weights of greater than 3,000,000 possible. The additional monomer can also be one or more different monomers, leading to the formation of a block copolymer. The process of the invention produces a pure block copolymer, since virtually all of the first stage monomer is consumed prior to introduction of the second monomer. The second stage monomer can advantageously be quite different than the first stage monomer, as in the case where one monomer is hydrophilic and the other hydrophobic. Amphiphilc block copolymers and novel block copolymer combinations are possible using the process of the present invention. The process is not limited by reactivity ratios, but is rather limited only by diffusion. Tapered polymers can also be produced by the control over the reaction offered by the process of the invention.

Solids levels of the copolymer dispersions can be in the range of from 5 to 50 percent by weight, and preferably from 10 to 30 percent by weight.

Termination of precipitated polymer radicals can be accomplished by one or more steps such as reducing the temperature of the reaction chamber, increasing the pressure within the reaction chamber; adding a suitable solvent for the resulting polymer; adding a suitable chain transfer agent (e.g., a mercaptan type agent) to the system; introducing a suitable radical scavenger (e.g., oxygen); or by vaporizing some of the solvent in reactor.

Polymer dispersions produced by the present invention may be used in adhesives, paints, industrial coatings, inks, film-formers, polymeric surfactants, stabilizers, tougheners, binders, non-woven materials, specialty additives, rheology modifiers, thermoplastic elastomers, polymeric compatibilizers, bio-adhesives, and a variety of other commercial applications.

The following examples are presented to further illustrate and explain the present invention and should not be taken as limiting in any regard. The final product from a typical reaction (except example IV below) was a bluish white emulsion with insignificant coagulum. The emulsion was stable at room temperature with no creaming or settling obvious even after one year. The copolymers obtained were characterized using thermal analysis (differential scanning calorimetry) and fractionation/solvent extraction to verify their blocky structure.

EXAMPLE I

Stage I. Uninhibited Methyl methacrylate (MMA) monomer (37 mL) and diethyl ether (300 mL) were purged with subsurface nitrogen for 15 min. Water (100 mL) and 7.6 g. surfactant (IGEPAL CA-897, Rhodia) solution in a round bottom flask was deoxygenated by evacuating for one minute and breaking the vacuum with Argon, the process of which was repeated twice. As a final step, the water-surfactant mixture was completely deoxygenated by freezing it in a dry-ice acetone mixture while keeping it under vacuum. The vacuum was maintained while allowing it to thaw completely to let any dissolved gases escape. The vacuum was then replaced with an Argon blanket. Water (500 mL) and initiator (0.4792 g.) (2,2'-Azobis (N,N'-amidinopropane) dihydrochloride or V-50, Wako chemicals) solution was purged with nitrogen for 20 min. The ether and MMA were added to the water surfactant mixture by canula transfer. A pre-emulsion was made using a high shear homogenizer blade. The admixture was kept oxygen free by maintaining a constant flow of Argon saturated with ether through the round bottom flask. This pre-emulsion was inverted into an emulsion by diluting with the initiator-water mixture (350 mL) by canula transfer. This emulsion was transferred into a shot bomb and then loaded into the reactor with 20 psig of nitrogen overpressure. The transfers were effected using nitrogen pressure. The reactor was heated up to 80° C. in 25 min. The pressure was regulated at 60 psig. The take-off valve was opened after 1 hour and ether was stripped from the reactor at such a rate as to be completely removed in 3 hours. Samples were taken at irregular intervals to determine conversion and molecular weight.

Stage II: Water (55 mL) and IGEPAL CA-897 surfactant (Rhodia) (2.95 g.) solution in a round bottom flask was deoxygenated by the same process as described above in stage I. MMA (95 mL) was deoxygenated by purging with subsurface nitrogen for 15 min. A pre-emulsion was made by adding the MMA to the water surfactant mixture under high shear. This was diluted with 50 mL water. The resulting emulsion was loaded into reactor over 5 min. The reactor was cooled to 60° C. in 10 min and the pressure was set at 60 psig. Samples were taken to determine conversion and molecular weight. Conversion was determined gravimetrically and molecular weight was determined using size exclusion chromatography on a waters system using waters styragel columns and polystyrene standards. The conversion and molecular weight data are given in Table I.

EXAMPLE II

Stage I. Uninhibited styrene monomer (42 mL) and diethyl ether (300 mL) were purged with subsurface nitrogen for 15 min. Water (113 mL) and 7.6 g. surfactant (IGEPAL CA-897, Rhodia) solution in a round bottom flask was deoxygenated by evacuating for one minute and breaking the vacuum with Argon, the process of which was repeated twice. As a final step, the water-surfactant mixture was completely deoxygenated by freezing it in a dry-ice acetone mixture while keeping it under vacuum. The vacuum was maintained while allowing it to thaw completely to let any dissolved gases escape. The vacuum was then replaced with an Argon blanket. Water (520 mL) and initiator (0.5785 g.) (VA-044 (2,2'-Azobis (N,N'-dimethyleneisobutyramidine) dihydrochloride), Wako chemicals) solution was purged with nitrogen for 20 min. The ether and styrene were added to the water surfactant mixture by canula transfer. A pre-emulsion was made using a high shear homogenizer blade. The admixture was kept oxygen free by maintaining a constant flow of Argon saturated with ether through the round bottom flask. This pre-emulsion was inverted into an emulsion by diluting with the initiator-water mixture (390 mL) by canula transfer. This emulsion was transferred into a shot bomb and then loaded into the reactor with 20 psig of nitrogen overpressure. The transfers were effected using nitrogen pressure. The reactor was heated up to 60° C. in 25 min. The pressure was regulated at 80 psig. The take-off valve was opened after 4 hours and ether was stripped from the reactor at such a rate as to be completely removed in 4 hours. Samples were taken at irregular intervals to determine conversion and molecular weight.

Stage II: Water (52 mL) and IGEPAL CA-897 surfactant (Rhodia) (1.48 g.) solution in a round bottom flask was deoxygenated by the same process as described above in stage I. Styrene (89 mL) was deoxygenated by purging with subsurface nitrogen for 15 min. A pre-emulsion was made by adding the styrene to the water surfactant mixture under high shear. This was diluted with 50 mL water. The resulting emulsion was loaded into reactor over 1 min. The reactor was kept at 60° C. and the pressure was set at 65 psig. Samples were taken to determine conversion and molecular weight. Conversion was determined gravimetrically and molecular weight was determined using size exclusion chromatography on a waters system using waters styragel columns and polystyrene standards. The conversion and molecular weight data is given in Table I.

EXAMPLE III

Stage I. Uninhibited MMA monomer (50 mL) and diethyl ether (300 mL) were purged with subsurface nitrogen for 15 min. Water (102 mL) and 7.4 g. surfactant (IGEPAL CA-897, Rhodia) solution in a round bottom flask was deoxygenated by evacuating for one minute and breaking the vacuum with Argon, the process of which was repeated twice. As a final step, the water-surfactant mixture was completely deoxygenated by freezing it in a dry-ice acetone mixture while keeping it under vacuum. The vacuum was maintained while allowing it to thaw completely to let any dissolved gases escape. The vacuum was then replaced with an Argon blanket. Water (500 mL) and initiator (0.7168 g.) (2,2'-Azobis (N,N'-amidinopropane) dihydrochloride or V-50, Wako chemicals) solution was purged with nitrogen for 20 min. The ether and MMA were added to the water surfactant mixture by canula transfer. A pre-emulsion was made using a high shear homogenizer blade. The admixture was kept oxygen free by maintaining a constant flow of Argon saturated with ether through the round bottom flask. This pre-emulsion was inverted into an emulsion by diluting with the initiator-water mixture (400 mL) by canula transfer. This emulsion was transferred into a shot bomb and then loaded into the reactor with 20 psig of nitrogen overpressure. The transfers were effected using nitrogen pressure. The reactor was heated up to 75° C. in 25 min. The pressure was regulated at 80 psig. The take-off valve was opened after 3 hours and ether was stripped from the reactor at such a rate as to be completely removed in 3.5 hours. Samples were taken at irregular intervals to determine conversion and molecular weight.

Stage II: Water (121 mL) and IGEPAL CA-897 surfactant (Rhodia) (1.54 g.) solution in a round bottom flask was deoxygenated by the same process as described above in stage I. Uninhibited n-butyl acrylate (82 mL) was deoxygenated by purging with subsurface nitrogen for 15 min. A pre-emulsion was made by adding the n-BA to the water surfactant mixture under high shear. This was diluted with 50 mL water. The resulting emulsion was loaded into reactor over 1 min. The reactor was cooled to 60° C. in 10 min and the pressure was set at 56 psig. Samples were taken to determine conversion and molecular weight. Conversion was determined gravimetrically and molecular weight was determined using size exclusion chromatography on a waters system using waters styragel columns and polystyrene standards. The conversion and molecular weight data is given in Table I.

EXAMPLE IV

Stage I. Uninhibited MMA monomer (43 mL) and diethyl ether (295 mL) were purged with subsurface nitrogen for 15 min. Water (101 mL) and 7.54 g. surfactant (IGEPAL CA-897, Rhodia) solution in a round bottom flask was deoxygenated by evacuating for one minute and breaking the vacuum with Argon, the process of which was repeated twice. As a final step, the water-surfactant mixture was completely deoxygenated by freezing it in a dry-ice acetone mixture while keeping it under vacuum. The vacuum was maintained while allowing it to thaw completely to let any dissolved gases escape. The vacuum was then replaced with an Argon blanket. Water (500 mL) and initiator (0.5272 g.) (2,2'-Azobis (N,N'-amidinopropane) dihydrochloride or V-50, Wako chemicals) solution was purged with nitrogen for 20 min. The ether and MMA were added to the water surfactant mixture by canula transfer. A pre-emulsion was made using a high shear homogenizer blade. The admixture was kept oxygen free by maintaining a constant flow of Argon saturated with ether through the round bottom flask. This pre-emulsion was inverted into an emulsion by diluting with the initiator-water mixture (400 mL) by canula transfer. This emulsion was transferred into a shot bomb and then loaded into the reactor with 20 psig of nitrogen overpressure. The transfers were effected using nitrogen pressure. The reactor was heated up to 80° C. in 25 min. The pressure was regulated at 67 psig. The take-off valve was opened after 2 hours and ether was stripped from the reactor at such a rate as to be completely removed in 2.5 hours. Samples were taken at irregular intervals to determine conversion and molecular weight.

Stage II: Water (100 mL) and IGEPAL CA-897 surfactant (Rhodia) (2.08 g.) solution in a round bottom flask was deoxygenated by the same process as described above in stage I. Uninhibited MMA (59 mL) mixed with uninhibited methacrylic acid (MAA) (29 mL) was deoxygenated by purging with subsurface nitrogen for 15 min. A pre-emulsion was made by adding the MMA/MAA mixture to the water surfactant mixture under high shear. This was diluted with 50 mL water. The resulting emulsion was loaded into reactor over 1 min. The reactor was cooled to 60° C. in 10 min and the pressure was set at 60 psig. Samples were taken to determine conversion and molecular weight. Conversion was determined gravimetrically and molecular weight was determined using size exclusion chromatography on a waters system using waters styragel columns and polystyrene standards. The conversion and molecular weight data is given in Table I. The surfactant used in this reaction was not suitable for stabilizing the product and the resulting copolymer emulsion coagulated towards the end of the reaction. This highlights the importance of the right surfactant or surfactant package to produce a stable copolymer dispersion.

EXAMPLE V

Stage I. Uninhibited styrene monomer (43 mL) and diethyl ether (300 mL) were purged with subsurface nitrogen for 15 min. Water (101 mL) and 7.41 g. surfactant (IGEPAL CA-897, Rhodia) solution in a round bottom flask was deoxygenated by evacuating for one minute and breaking the vacuum with Argon, the process of which was repeated twice. As a final step, the water-surfactant mixture was completely deoxygenated by freezing it in a dry-ice acetone mixture while keeping it under vacuum. The vacuum was maintained while allowing it to thaw completely to let any dissolved gases escape. The vacuum was then replaced with an Argon blanket. Water (500 mL) and initiator (0.4913 g.) (2,2'-Azobis (N,N'-amidinopropane) dihydrochloride or V-50, Wako chemicals) solution was purged with nitrogen for 20 min. The ether and styrene were added to the water surfactant mixture by canula transfer. A pre-emulsion was made using a high shear homogenizer blade. The admixture was kept oxygen free by maintaining a constant flow of Argon saturated with ether through the round bottom flask. This pre-emulsion was inverted into an emulsion by diluting with the initiator-water mixture (400 mL) by canula transfer. This emulsion was transferred into a shot bomb and then loaded into the reactor with 20 psig of nitrogen overpressure. The transfers were effected using nitrogen pressure. The reactor was heated up to 75° C. in 25 min. The pressure was regulated at 60 psig. The take-off valve was opened after 4 hours and ether was stripped from the reactor at such a rate as to be completely removed in 3 hours. Samples were taken at irregular intervals to determine conversion and molecular weight.

Stage II: Water (52 mL) and IGEPAL CA-897 surfactant (Rhodia) (1.48 g.) solution in a round bottom flask was deoxygenated by the same process as described above in stage I. Styrene (89 mL) was deoxygenated by purging with subsurface nitrogen for 15 min. A pre-emulsion was made by adding the styrene to the water surfactant mixture under high shear. This was diluted with 50 mL water. The resulting emulsion was loaded into reactor over 1 min. The reactor still at 60° C. and the pressure was set at 65 psig. Samples were taken to determine conversion and molecular weight. Conversion was determined gravimetrically and molecular weight was determined using size exclusion chromatography on a waters system using waters styragel columns and polystyrene standards. The conversion and molecular weight data is given in Table I.

The particle size and particle size distribution was determined for these examples using a Brookhaven Instruments BI90plus particle size analyzer. The samples were examined by high resolution optical microscope for the presence of particles too large to be detected by laser light scattering on the BI90plus. The particle size data as well as conversion and molecular weight data was used to calculate the number of living polymer radicals in each emulsion particle. The results for this calculation are shown in Table II for examples I, II, and V.

TABLE I

Conversion and molecular weight data for examples I–V

| Experiment | | Overall Reaction Time[1] (hrs.) | Overall Conversion | Molecular Weight[2][3][4] | Polydispersity Index |
|---|---|---|---|---|---|
| Example I | Stage I | 4.4 | 91% | 33000 | 1.7 |
| | Stage II | 24.3 | >99% | 411000 | 2.2 |
| Example II | Stage I | 8.4 | 82% | 66000 | 11 |
| | Stage II | 9.2 | 61% | 158000 | 4.5 |
| | | 10.3 | 86% | 339000 | 3 |
| | | 11.1 | >92% | 586000 | 2.9 |
| Example III | Stage I | 7.0 | >99% | $M_{peak} = 486000$ | —[3] |
| | Stage II | 8.8 | 92% | $M_{peak} = 595000$ | —[3] |
| Example IV | Stage I | 5.0 | >99% | $M_{peak} = 18000$ | —[3] |
| | Stage II | 21.0 | 70% | $M_{peak} = 2870000$ | —[3] |
| Example V | Stage I | 8.2 | 99% | 92000 | 7.2 |
| | Stage II | 24.0. | 97% | 101000 | 4.7 |

[1]Reaction times for stage II were started from the final reaction times for stage I e.g. if stage I ended at 8 hrs. stage II time was started from 8 hrs. onwards.
[2]Number average molecular weight except where $M_{peak}$ values are reported due to significant lower molecular weight shoulders. $M_{peak}$ values are reported for MMA polymerization due to the presence of homopolymer contamination of about 10–20% resulting in bimodal distributions. All other distributions reported are unimodal. Polydispersity Index values not reported where average molecular weights were not available.
[3]Molecular weights for all homopolymers and copolymers were based on polystyrene standards. This may result in copolymer molecular weights apparently decreasing with conversion due to the reduced solubility of the copolymer in the elution medium.
[4]The second stage molecular weight is a function of monomer amount as well as the number of radicals that are trapped in the first stage.

TABLE II

Particle size data and estimated radical population per emulsion particle

| Experiment | Particle size | Distribution | Number of living (trapped) radicals per particle |
|---|---|---|---|
| Experiment I | 77 nm. | Unimodal | 184 |
| Experiment II | 107 nm. | Unimodal | 1670 |
| Experiment V | 50 nm. | Unimodal | 919 |

What is claimed is:

1. A dispersion comprising polymer particles dispersed in a dispersion medium, wherein said polymer particles each contain on average greater than 2 living radicals in each polymer particle, and wherein said living radicals are not chemically protected or capped, and wherein said polymer particles have an average particle size of from 10 to 5000 nanometers.

2. The dispersion of claim 1 wherein said polymer particles each contain on average greater than 3 living radicals in each polymer particle.

3. The dispersion of claim 2 wherein said polymer particles each contain on average greater than 5 living radicals in each polymer particle.

4. The dispersion of claim 3 wherein said polymer particles each contain on average greater than 20 living radicals in each polymer particle.

5. The dispersion of claim 4 wherein said polymer particles each contain on average greater than 100 living radicals in each polymer particle.

6. The dispersion of claim 5 wherein said polymer particles each contain on average greater than 1000 living radicals in each polymer particle.

7. The dispersion of claim 1 wherein said polymer particles have an average particle size of from 10 to 500 nanometers.

8. The dispersion of claim 7 wherein said polymer particles have an average particle size of from 20 to 150 nanometers.

9. The dispersion of claim 1 wherein said polymer particles have an unimodal particle size distribution.

10. The dispersion of claim 1 wherein said dispersion medium comprises water.

* * * * *